United States Patent [19]

Carbrey

[11] 3,745,555

[45] July 10, 1973

[54] NONLINEAR CHARGE REDISTRIBUTION PCM CODER

[75] Inventor: Robert Lawrence Carbrey, Boulder, Colo.

[73] Assignee: Bell Telephone Laboratories, Incorporated, Murray Hill, N.J.

[22] Filed: June 1, 1971

[21] Appl. No.: 148,313

Related U.S. Application Data

[63] Continuation-in-part of Ser. No. 889,398, Dec. 31, 1969, abandoned.

[52] U.S. Cl. .......................................... 340/347 AD

[51] Int. Cl. .......................................... H03k 13/02

[58] Field of Search............... 340/347 AD, 347 NT, 340/347 C; 324/99 D; 235/183; 179/15 AV; 325/38; 332/11

[56] References Cited

UNITED STATES PATENTS

| | | | |
|---|---|---|---|
| 3,585,634 | 6/1971 | Sharples | 340/347 |
| 3,218,630 | 11/1965 | Jankovich | 340/347 |
| 3,049,701 | 8/1962 | Amdahl et al. | 340/347 |
| 2,716,732 | 8/1955 | Garner et al | 340/347 |

*Primary Examiner*—Charles D. Miller
*Attorney*—W. L. Keefauver and E. W. Adams, Jr.

[57] ABSTRACT

A circulating pulse code modulation (PCM) encoder utilizes capacitive charge redistribution techniques to obtain a hyperbolic self-companding characteristic. The analog sample to be encoded is used as a charging reference voltage, and, by means of an offset bias source, a zero volt decision level forms the basis for PCM signal emission.

9 Claims, 12 Drawing Figures

SWITCH 4 CONTROL

SWITCH 6 & 7 CONTROL

INVENTOR
R. L. CARBREY
BY David P. Kelley
ATTORNEY

FIG. 3

| SIGNAL | | DIGIT 1 | | | | DIGIT 2 | | | | DIGIT 3 | | | | DIGIT 4 | | | | PCM WORD |
|---|---|---|---|---|---|---|---|---|---|---|---|---|---|---|---|---|---|---|
| $V_r$ | $V_{C1}$ | $V_{C2}(1)$ | $V_{C11}(1)$ | $e_d(1)$ | D(1) | $V_{C2}(2)$ | $V_{C11}(2)$ | $e_d(2)$ | D(2) | $V_{C2}(3)$ | $V_{C11}(3)$ | $e_d(3)$ | D(3) | $V_{C2}(4)$ | $V_{C11}(4)$ | $e_d(4)$ | D(4) | |
| $15^+$ | $16^+$ | $8^+$ | 0 | $7^+$ | 0 | $4^+$ | 0 | $3^+$ | 0 | $2^+$ | 0 | $1^+$ | 0 | $1^+$ | 0 | $0^+$ | 0 | 0000 |
| 15 | 16 | 8 | 0 | 7 | 0 | 4 | 0 | 3 | 0 | 2 | 0 | 1.0 | 0 | 1 | 0 | 0.0 | 1 | 0001 |
| 7 | 8 | 4 | 0 | 3 | 0 | 2 | 0 | 1 | 0 | 1 | 0 | 0.0 | 1 | .5 | 1.0 | .5 | 0 | 0010 |
| 4.34 | 5.34 | 2.66 | 0 | 1.66 | 0 | 1.33 | 0 | .33 | 0 | .67 | 0 | -.33 | 1 | .33 | .67 | 0.0 | 1 | 0011 |
| 3 | 4 | 2 | 0 | 1 | 0 | 1 | 0 | 0.0 | 1 | .5 | 1.0 | .5 | 0 | .25 | 1.0 | .25 | 0 | 0100 |
| 2.2 | 3.2 | 1.6 | 0 | 0.6 | 0 | .8 | 0 | -.2 | 1 | .4 | .8 | .2 | 0 | .2 | .80 | 0.0 | 1 | 0101 |
| 1.67 | 2.67 | 1.33 | 0 | 0.33 | 0 | .67 | 0 | -.33 | 1 | .33 | .67 | 0.0 | 1 | .17 | 1.0 | .17 | 0 | 0110 |
| 1.28 | 2.28 | 1.14 | 0 | 0.14 | 0 | .57 | 0 | -.43 | 1 | .29 | .57 | -.14 | 1 | .14 | .86 | 0.0 | 1 | 0111 |
| 1.0 | 2.0 | 1 | 0 | 0.0 | 1 | .5 | 1 | .5 | 0 | .25 | 1.0 | .25 | 0 | .125 | 1.0 | .125 | 0 | 1000 |
| 0.78 | 1.78 | .89 | 0 | -.11 | 1 | .45 | .89 | .33 | 0 | .22 | .89 | .11 | 0 | .11 | .89 | 0.0 | 1 | 1001 |
| 0.6 | 1.6 | .8 | 0 | -.2 | 1 | .4 | .8 | .2 | 0 | .20 | .8 | 0.0 | 1 | .1 | 1.0 | .1 | 0 | 1010 |
| 0.45 | 1.45 | .725 | 0 | -.275 | 1 | .363 | .725 | .09 | 0 | .18 | .725 | -.09 | 1 | .09 | .91 | 0.0 | 1 | 1011 |
| 0.33 | 1.33 | .667 | 0 | -.333 | 1 | .333 | .667 | 0.0 | 1 | .167 | 1.0 | .167 | 0 | .08 | 1.0 | 0.8 | 0 | 1100 |
| 0.23 | 1.23 | .615 | 0 | -.385 | 1 | .30 | .615 | -.085 | 1 | .15 | .915 | .075 | 0 | .075 | .915 | 0.0 | 1 | 1101 |
| 0.14 | 1.14 | .57 | 0 | -.43 | 1 | .285 | .57 | -.14 | 1 | .14 | .86 | 0.0 | 1 | .07 | 1.0 | .07 | 0 | 1110 |
| 0.067 | 1.067 | .533 | 0 | -.467 | 1 | .267 | .533 | -.20 | 1 | .133 | .80 | -.067 | 1 | .067 | .933 | 0.0 | 1 | 1111 |

NONLINEAR CHARGE REDISTRIBUTION PCM CODER

CROSS REFERENCE TO RELATED APPLICATION

This application is a continuation-in-part of my copending application, Ser. No. 889,398, filed Dec. 31, 1969, now abandoned, entitled "Nonlinear Charge Redistribution PCM Coder."

BACKGROUND OF THE INVENTION

This invention relates to the nonlinear conversion of analog signals to pulse code modulation signals. In particular, the nonlinear coding utilized is volume compression and expansion, i.e., companding.

In pulse code modulation (PCM), a digital word corresponding to a set of discrete levels, known as quantum levels, is assigned to each of the analog signal samples to be encoded. That is, in the amplitude range within which the analog signals may fall, certain discrete levels which are multiples of the basic quantum are chosen. These discrete levels are designated as quantum levels. An appropriate set of quantum levels is then sequentially assigned to the analog signal sample such that, when the voltages representative of the quantum levels are combined, they give an approximation of the sample. Thus, each PCM word is a group of ones and zeroes, each of which represents the presence or absence of the corresponding quantum level in the coded sample.

Obviously, a coding process which approximates an analog signal by assigning combinations of discrete quantities of predetermined size contains a certain amount of inherent coding error. This coding error is commonly known as quantizing noise. If the quantum levels are chosen at regular intervals through the signal amplitude range, the percentage error will not be constant for samples of all sizes; clearly, larger signals can tolerate rather large quantizing noise figures while maintaining a reasonable percentage of error, while smaller signals yield a greater percentage of error for comparable quantizing noise levels. Thus, it is desirable to keep the signal to quantizing noise ratio at a fairly constant relative maximum over the signal range. It is evident that a judicious choice of quantum levels will, on the average, accomplish this goal.

One such method for reduction of quantizing noise is called volume compression and expansion, or companding. In companding, quantum levels in the small signal range are more numerous than in the larger amplitude ranges; that is, they are compressed in the small signal range. The express purpose of companding is the maximization of the average signal to quantizing noise ratio over the amplitude range. In this manner, quantizing noise is rather evenly distributed on a percentage basis and is relatively minimized. It is noteworthy that companding is an inherently nonlinear process with the prevalent companding functions being either logarithmic or hyperbolic functions.

Traditionally, companded PCM systems have featured discrete compressing and encoding units on their transmitting ends as well as discrete decoding and expanding units at their receiving ends. Recently, however, a class of PCM systems has been developed in which the compression and encoding units are combined into a self-compressing encoder and the decoding and expanding units have been combined into a self-expanding decoder.

One class of encoders which has provided generally satisfactory performance characteristics is the sequential circulating type. Typically, circulating encoders operate by means of periodic decisions, subsequent internal adjustments and further decisions. These decisions usually compare some datum level with an approximated sample comprising a combination of quantum levels from a quantum level generator. The datum level might be either the amplitude of the sample to be encoded or a designated decision level. Furthermore, the internal adjustments might consist of the variation of circuit elements or voltage levels. In any case, the encoding operation utilizes successive approximations until the desired accuracy is obtained.

One class of circulating PCM encoders features a voltage source which generates a series of discrete levels which serve as quantum levels. For example, one group in this class uses the decaying oscillations of an excited RC tank circuit as a quantum level generator. The positive and negative oscillations are sequentially added to or subtracted from the analog sample approximation and subsequent decisions are made as to whether that particular quantum level should be included or excluded from the encoded sample. Another group of encoders utilizes a plurality of current or voltage generators with a switched resistance matrix as a quantum level generator.

SUMMARY OF THE INVENTION

The present invention overcomes many of the disadvantages inherent in the foregoing prior art circulating type encoders. Foremost, the network used to generate the quantum levels in the present invention is a capacitive redistributing pair. Thus, the quantum levels obtained therefrom are more precise and consistent than in the decaying oscillation type encoder for example, resulting in a significant improvement in encoding accuracy. In addition, since a plurality of current or voltage generators is not used, the loop structure of the invention is considerably simpler than most of the other arrangements in the class, resulting in further enhancement of encoding accuracy.

The present invention is a self-compressing PCM encoder which operates in a circulating mode. Its periodic decisions involve comparison of a stored voltage with a chosen datum level and its subsequent adjustments are to this stored voltage.

In an illustrative enbodiment of the invention, a pair of matched redistributing capacitors is used to produce a series of sequentially decaying reference pulses which are directly dependent upon the size of the sample to be encoded. A selective accumulation of these reference pulses is periodically compared with a decision level and digital signals which are indicative of this comparison are emitted. This process is repeated as often as is necessary to obtain the desired encoding accuracy.

It is a feature of the present invention that a capacitive voltage redistribution is controlled in accordance with the binary code to generate a hyperbolic compression characteristic. In addition, automatic scaling provides an optimum match to the signal level in a composite circulating encoder. These and other features of the present invention will be more readily apparent from the following detailed description taken in conjunction with the accompanying drawings.

BRIEF DESCRIPTION OF THE DRAWINGS

FIG. 3 is a table of voltages for the embodiment of FIG. 2;

DETAILED DESCRIPTION

Figure 1A:
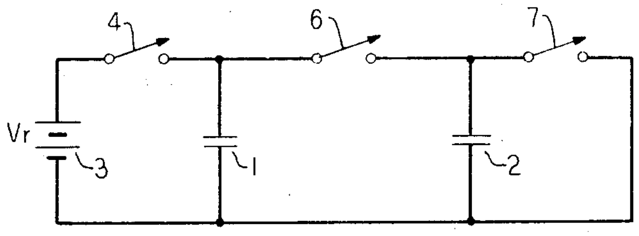
FIG. 1A PRIOR ART
FIGS. 1A through 1E depict schematically a two capacitor redistributor and the voltage waveforms therefor.
Figure 1B:
Figure 1C:
Figure 1D:
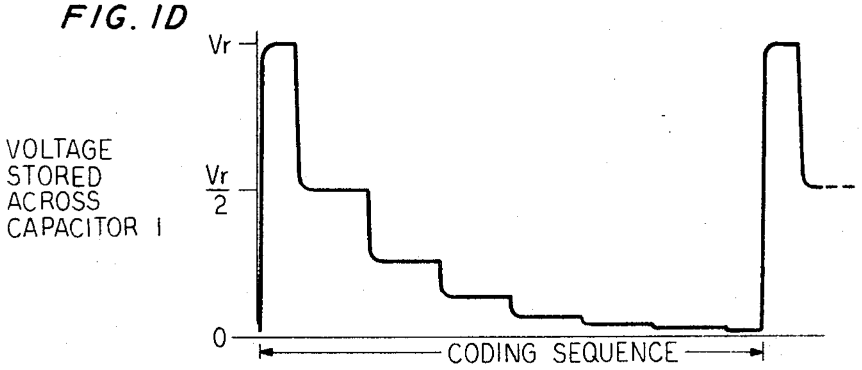
Figure 1E:
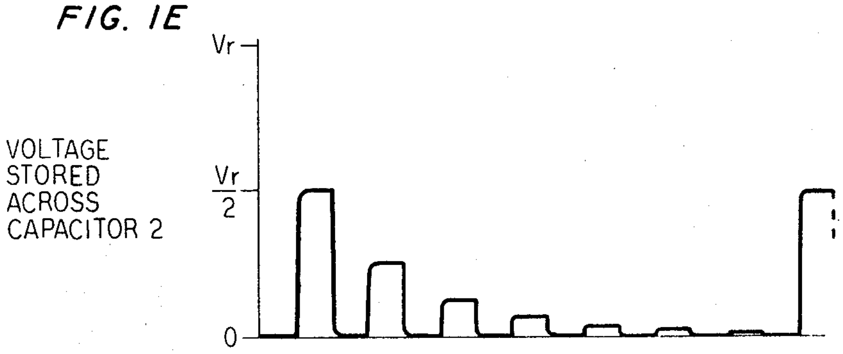

In FIG. 1, there is shown the capacitive redistribution network which serves as a quantum level generator for the encoders embodying the principles of the present invention. As is shown in FIG. 1A, the generator comprises two matched capacitors 1 and 2 connected in parallel and to ground by switches 6 and 7 and, by means of a switch 4, to some reference voltage source 3 designated as $V_r$. At the beginning of each encoding sequence, switch 6 is opened and switches 4 and 7 are closed. Capacitor 1 is thus charged to $V_r$ and capacitor 2 is discharged. Switch 4, under the control of the pulse waveform of FIG. 1B, is then opened and remains so for the remainder of the redistributing sequence. Complimentary switches 6 and 7 are controlled by the voltage waveform of FIG. 1C; upon the occurrence of each pulse, switch 6 is closed and switch 7 is opened. Thus, charge is shared between the capacitors 1 and 2 whenever a closure of switch 6 occurs. If the capacitors are equal, the voltage on capacitor 1 is halved through charge redistribution with capacitor 2 whenever switch 6 is closed. Other values for these capacitors will yield different companding characteristics. For each coding sequence, the waveforms shown in FIGS. 1D and 1E result. We may note that the voltage stored on capacitor 1 is a continuously halved staircase function and the voltage across capacitor 2 is a series of pulses, each pulse being half the magnitude of the preceding pulse.

Figure 2:
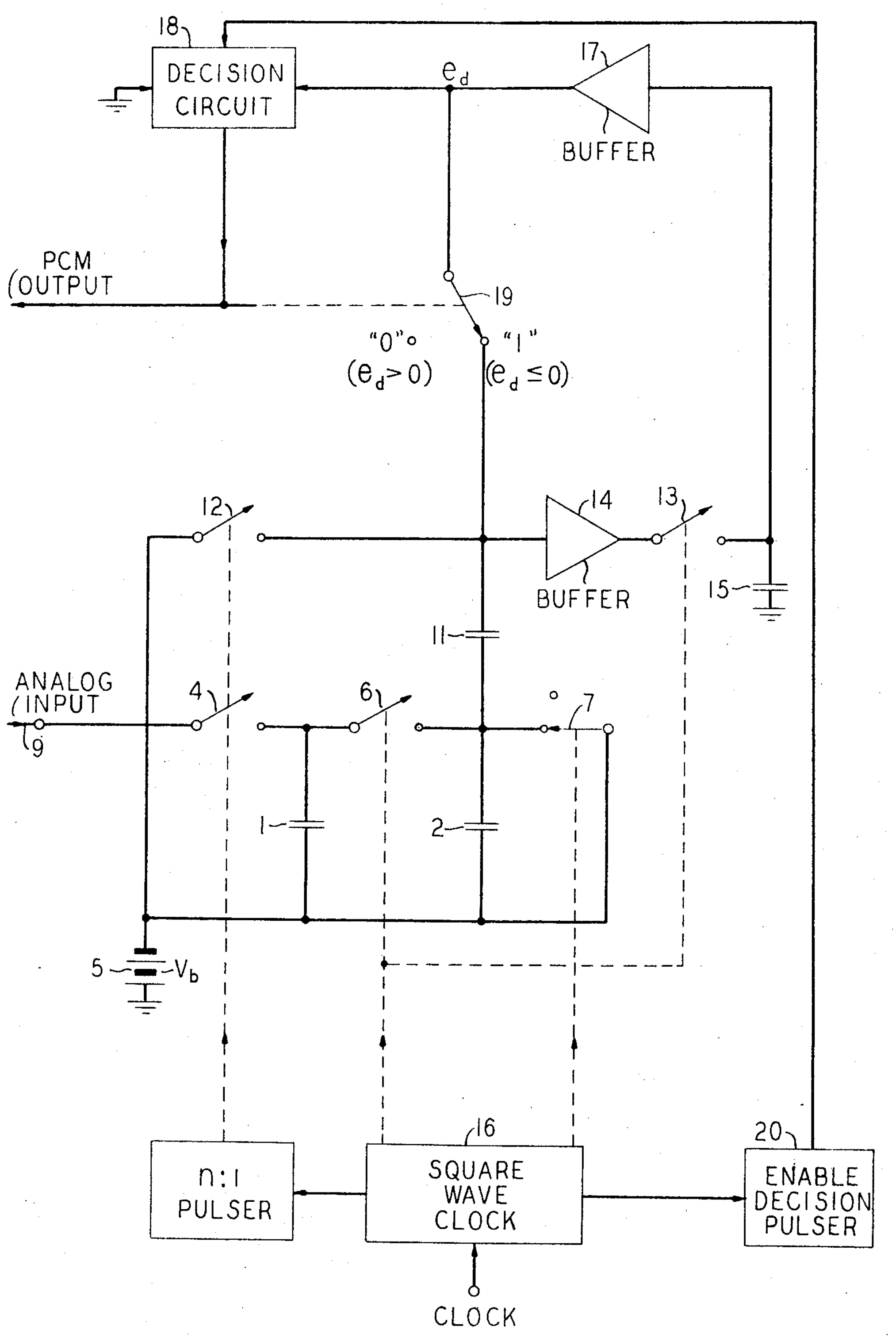
FIG. 2 shows a first illustrative embodiment of the invention in block diagram.

With this in mind, we can discuss the operation of the illustrative embodiment of the invention which is shown in FIG. 2. Capacitors 1 and 2, which are the redistributing capacitors, are equal in magnitude and operate in conjunction with switches 4, 6 and 7, as they did in the generator of FIG. 1. It is important to note, however, that the low terminal of the capacitors is now biased down by some scaling voltage $-V_b$ from a reference voltage source 5. As will be made apparent hereinafter, the choice of the voltage $V_b$ is important to the generation of the companding characteristic. In addition, the charging reference voltage for the redistribution process herein is the analog input 9; thus, the reference level $V_r$ for each redistribution sequence is the magnitude of the analog sample to be encoded. The voltage on capacitor 2 serves as a pedestal for the voltage stored on capacitor 11. The resultant voltage at the upper terminal of capacitor 11 is thus raised by an amount equal to the voltage stored on capacitor 2 minus $V_b$. The term "bootstrapping" is frequently applied to an operation of this type. The voltage appearing at the input terminal of buffer 14 (by buffer, or buffering means, we refer to some high input impedance, low output impedance, unity gain apparatus) is the algebraic sum of the voltages stored on capacitor 2 and capacitor 11 minus $V_b$.

The operation of the encoder proceeds as follows. At the beginning of each coding cycle, switches 4, 7 and 12 are closed and switches 6, 13 and 19 are opened. Capacitors 2 and 11 are thereby discharged and capacitor 1 is charged to the analog sample voltage minus the scaling bias voltage $-V_b$. Switches 4 and 12 are then opened and remain so for the remainder of the coding cycle. Then, switches 6 and 7 are operated by the square wave clock 16 (a flip-flop multivibrator) to accomplish the previously described redistribution process. Initially, capacitor 1 has been charged (to $V_r + V_b = V_{cl}$) and it redistributes with capacitor 2 upon closure of switch 6. This causes the voltage across capacitor 2 to be $V_{cl}/2$ and therefore the upper terminal of capacitor 11 is bootstrapped up to $V_{cl}/2 - V_b$ (with respect to ground). This is true as long as the input impedance of buffer 14 is high enough that negligible current is drawn from capacitor 11. Since switch 13 is closed whenever switch 6 is closed, temporary storage capacitor 15 is also charged to $V_{cl}/2 - V_b$. The buffer 14 (high input impedance and low output impedance) is required in order to provide a current source capable of charging capacitor 15 without disturbing the charge on capacitor 11 or capacitor 2. Buffer 17 serves a similar purpose, transmitting the voltage on capacitor 15, $e_d$, as a comparison voltage to the input of the decision circuit 18. The decision circuit 18 is activated by the enable decision pulser 20 each time switch 7 closes. It is the function of the decision circuit 18 to compare $e_d$ with a datum level of zero volts and to emit PCM output signals. Digital "1" pulses are emitted whenever $e_d$ is less than or equal to zero volts. Furthermore, switch 19 is controlled by these digital output signals. If ever switch 19 is closed (in the "1" position), it occurs when switch 7 is closed and capacitor 11 is charged to $e_d + V_b$. In other words, if $e_d$ is greater than zero volts, a "0", or no pulse, is emitted and switch 19 is opened; otherwise, a "1" is emitted and switch 19 is closed. Therefore, whenever $e_d$ is less than or equal to zero, capacitor 11 is charged to the voltage on capacitor 15 offset by $V_b$ (i.e., capacitor 11 is charged to $V_{cl}/2$); otherwise, capacitor 11 remains discharged.

On the second redistribution step, capacitors 1 and 2 are charged to $V_{cl}/4$. Thus, the top of capacitor 11 is bootstrapped either to $V_{cl}/4 - V_b$ or $3V_{cl}/4 - V_b$, depending upon whether the previous cycle had caused switch 19 to be opened or closed. Upon the bootstrapping of capacitor 11, capacitor 15 is charged to the bootstrapped voltage, which becomes the new $e_d$, and another comparison is made by the decision circuit 18. Then, switch 19 is once more opened or closed under the control of the resulting PCM signal. If this value of $e_d$ $(V_{cl}/4) - V_b$ or $3V_{cl}/4 - V_b$ is less than zero, capacitor 11 is charged to $e_d + V_b$; if not, switch 19 is not closed and the stored charge across capacitor 11 is not changed (0 or $V_{cl}/2$).

For the third cycle, the redistribution voltage is $V_{cl}/8$, so the bootstrapped voltage may be $V_{cl}/8 - V_b$, $3V_{cl}/8 - V_b$, $5V_{cl}/8 - V_b$, or $7V_{cl}/8 - V_b$, depending upon the voltage previously stored on capacitor 11. The cycle is then continued, and repeated in this manner until the desired degree of encoding accuracy is obtained.

The operation of the decision circuit 18 in conjunction with switch 19 and reference voltage $V_b$ 5 is quite important to the operation of the invention and warrants a more detailed consideration. Foremost, the choice of voltage source $V_b$ is important. $V_b$ must be negative in polarity and is chosen to be $V_{max}/2^n$ in magnitude, where $V_{max}$ is the maximum signal amplitude to be quantized and $n$ is the number of digits in the PCM word. Thus, if the magnitudes of the analog voltage samples to be encoded are normalized with respect to $V_b$, the normalized magnitudes will vary from zero to $2^n$. Furthermore, the redistributing voltage on capacitor 1 will vary from −1 to $2^n$−1. Thus, the decision circuit 18 can be operated with a decision level of zero volts. This is made possible by the negative polarity of $V_b$. Thus, a digital "1" is emitted when the voltage $e_d$ is less than or equal to the normalized zero volts.

It should be apparent that if a zero volt decision level is not desired, the circuit of FIG. 2 may be rearranged accordingly without departing from the principles of the present invention. That is, since the important feature for the generation of the companding characteristic disclosed herein is that the decision level be spaced an amount equal to $V_b$ above the potential at the unswitched junction of capacitors 1 and 2, other configurations than the one shown in FIG. 2 are practicable. For example, if capacitors 1 and 2 are connected to ground instead of to a bias offset source $V_b$5, and the decision level at which decision circuit 18 operates is $V_b$, no change will result in the operational sequence or the companding characteristic of the encoder. In fact, the only perceptible result will be a scaling up by an amount equal to $V_b$ of all the voltages produced in the embodiment of FIG. 2.

The principles of the present invention may become somewhat clearer when the previous description is considered in conjunction with the table of FIG. 3. This table gives normalized voltage levels for a four digit code at significant points in the loop. The voltages given therein are all normalized with respect to $V_b$. The particular input values given were chosen such that each input sample corresponds to a different one of the various code combinations. The columns listed under the heading "signal" designate the size of the samples to be encoded [$V_r$] and the net voltage on capacitor 1 with the bias voltage added [$V_{cl}$]. Each "digit $n$" heading shows the voltage stored on capacitor 11 from the previous cycle [$V_{cl1}(n-1)$], the redistribution voltage across capacitor 2 [$V_{c2}(n)$], the comparison voltage [$e_d(n)$], and the PCM digit signal [D(n)] for the $n^{th}$ encoding sequence.

It is appropriate to consider one of these encoding sequences in detail. As an example, take the sample of normalized value of 2.2. Due to the unit bias, $V_{cl}$ is 3.2. The first redistribution voltage, $V_{c2}$, is 1.6. Since $V_{cl1}(0)$ is zero, $e_d$ is 0.6 and digit one is "0." Thus, $V_{cl1}$ for the second cycle remains zero. The new redistribution voltage, $V_{c2}(2)$, is 0.8 and so $e_d(2)$ is −0.2. Therefore, digit two is a "1." Since digit two was a "1," a voltage is to be stored on capacitor 11. The top of capacitor 11 is at −0.2 and the bottom is at −1, so the stored voltage on capacitor 11 is 0.8. The next $V_{c2}$ is 0.4, so the $e_d$ for the digit 3 determination is 0.8+0.4−1, or 0.2. Digit 3 is therefore " 0." $V_{cl1}$ for the fourth digit determination therefore remains 0.8. The new redistribution voltage, $V_{c2}$, is 0.2; thus $e_d$ is 0.0 nd the fourth digit is a "1." Thus, the final PCM word representing a sample of 2.2 is 0101. Each of the signal samples if encoded in this manner.

The automatic scaling is apparent from the foregoing discussion. Since the reference voltage comprises the analog input sample, it automatically adjusts itself, and subsequent coder operation, to the size of the analog sample.

Figure 4A:
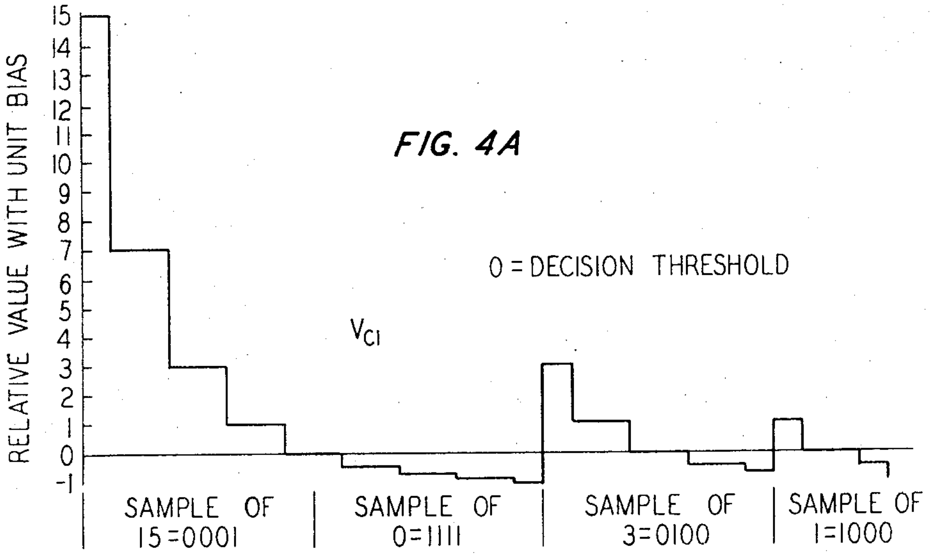
FIGS. 4A through 4D show waveforms for some of the voltages from the table of FIG. 3.
Figure 4B:
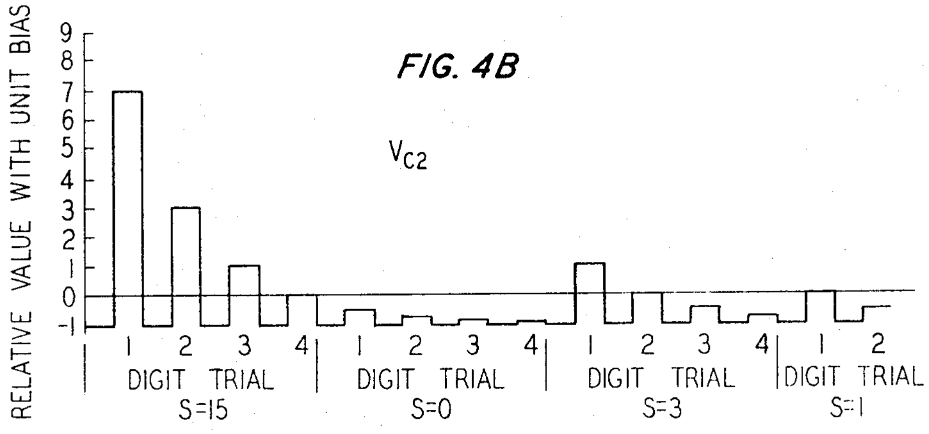
Figure 4C:
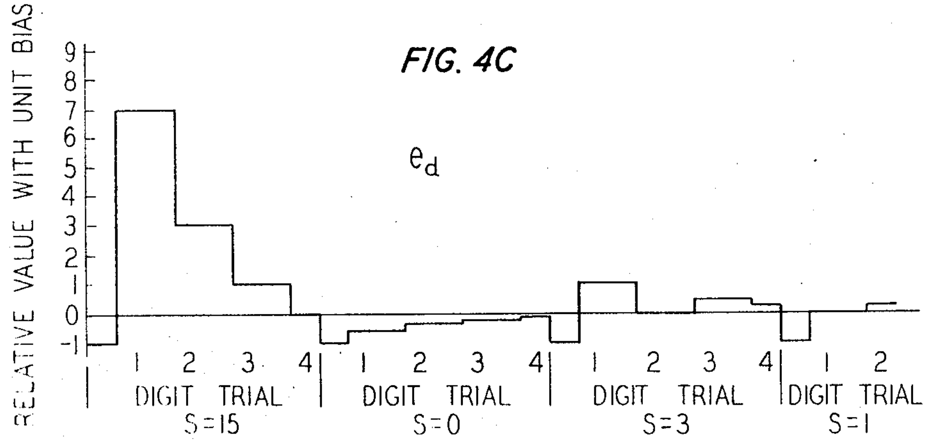

For clarity, the waveforms of four examples of these voltages are shown in FIGS. 4A, 4B, and 4C. The examples given are for sample sizes of 15, 0, 3, and 1. The waveforms of FIG. 4A represent the voltage at the top terminal of capacitor 1 ($V_{c1}$) with respect to ground and those of FIG. 4B are the voltage waveforms at the top terminal of capacitor 2 ($V_{c2} - V_b$). FIG. 4C is a diagram of the corresponding $e_d$ voltages. It is significant to note from the figures in FIG. 4C that a "1" results whenever $e_d$ is less than or equal to zero.

The waveforms of FIG. 4A clearly illustrate the effect of redistributing the charge stored on capacitor 1 between said capacitor and the repeatedly discharged capacitor 2. Each such redistribution results in a division by two of the initially stored voltage. It is a feature of this invention, however, that the initially stored voltage is not fixed, but is instead the sum of the analog signal voltage to be coded and a fixed bias voltage used as a scaling reference. It is evident from FIG. 4A that the smaller the size of the input sample, the more compressed are the quantum levels allocated to it. The voltages chosen for the table of FIG. 3 were chosen to correspond to the quantum levels, and their nonlinear nature is clearly evident. This may be illustrated graphically by FIG. 4D. The ordinate of this figure represents the input sample magnitude in multiples of the bias voltage $V_b$. On the abscissa are the binary codes which would be generated by the four successive approximations of the coding sequence when the input signal levels fall within the hatched range shown above. For the four digit codes shown, the fifteen quantum levels are hyperbolically distributed between $15V_b$ and $V_b/16$. The sixteenth code combination represents all input signal magnitudes greater than $15V_b$. The net effect of this compression is that quantizing noise is limited for low level signals and the signal to quantizing noise ratio is thereby kept rather uniform over the signal amplitude range.

Figure 4D:
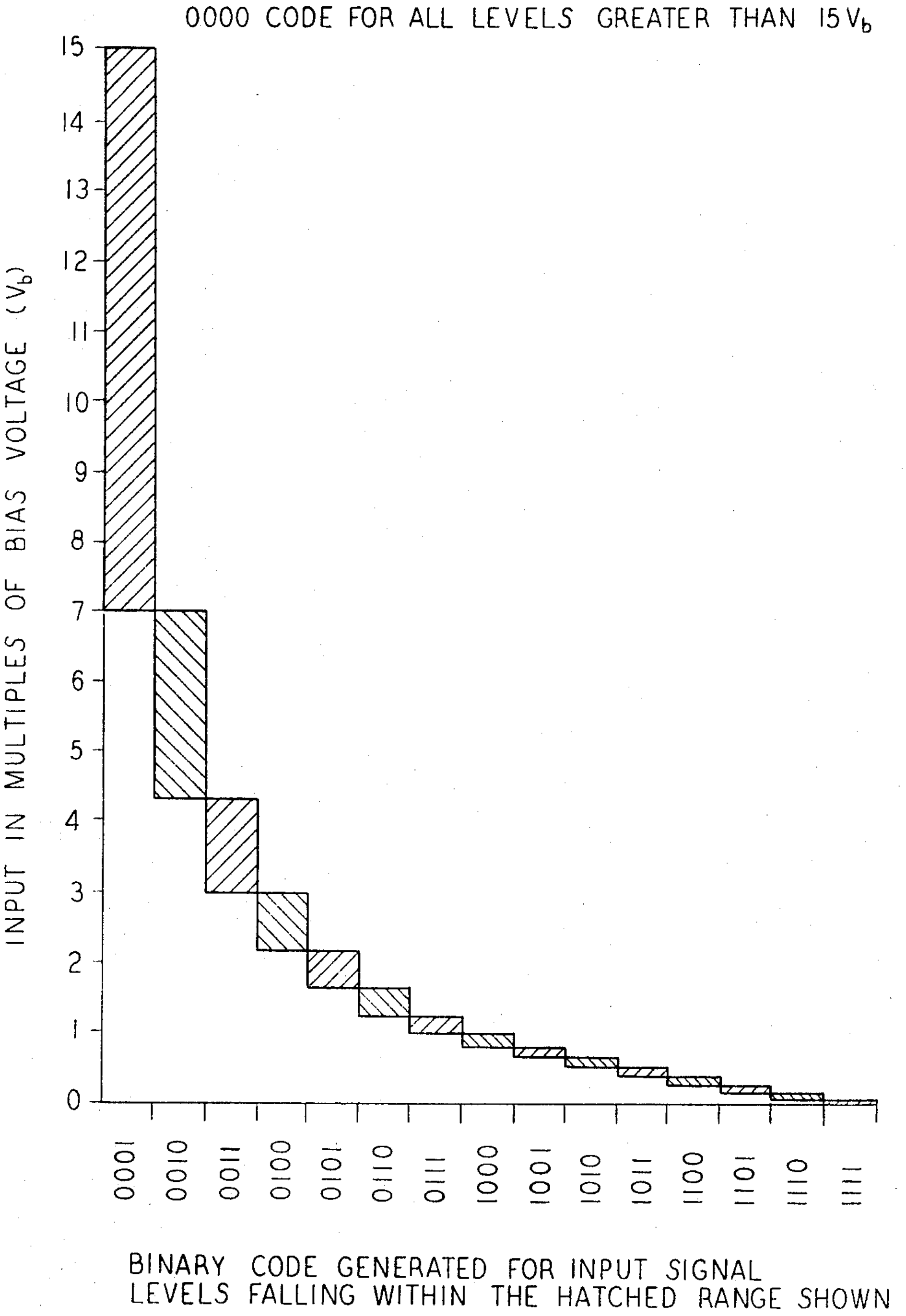

An inspection of FIG. 4D reveals that exactly half of the quantum levels occur between zero and $V_b$ and the remainder of the levels are for voltage values greater than $V_b$, thereby achieving a companding effect. That is to say, the choice of $V_b$ determines the degree of companding afforded by the encoder since each digit results from a determination of whether a voltage is greater or less than or equal to the decision level. With one-half of the regions below $V_b$, the smaller signals obviously are encoded with greater precision than are the larger signals.

In summary, then, the choice of decision level determines a level above and below which half of the quantum levels occur, while the periodic halving of the sample voltage by means of redistribution determines the relative spacing of the quantum levels.

It is important to realize that the illustrative embodiment of the invention as shown in FIG. 2 operated only for signals of positive polarity. However, the invention is readily amenable to any of the several means in use for adapting unipolar coders to bipolar signals. These include polarity switching full-wave rectification. Polarity considerations were ignored in the discussion of FIG. 2 for the sake of simplicity only; their addition effects the principles of the present invention in no way.

Figure 5:
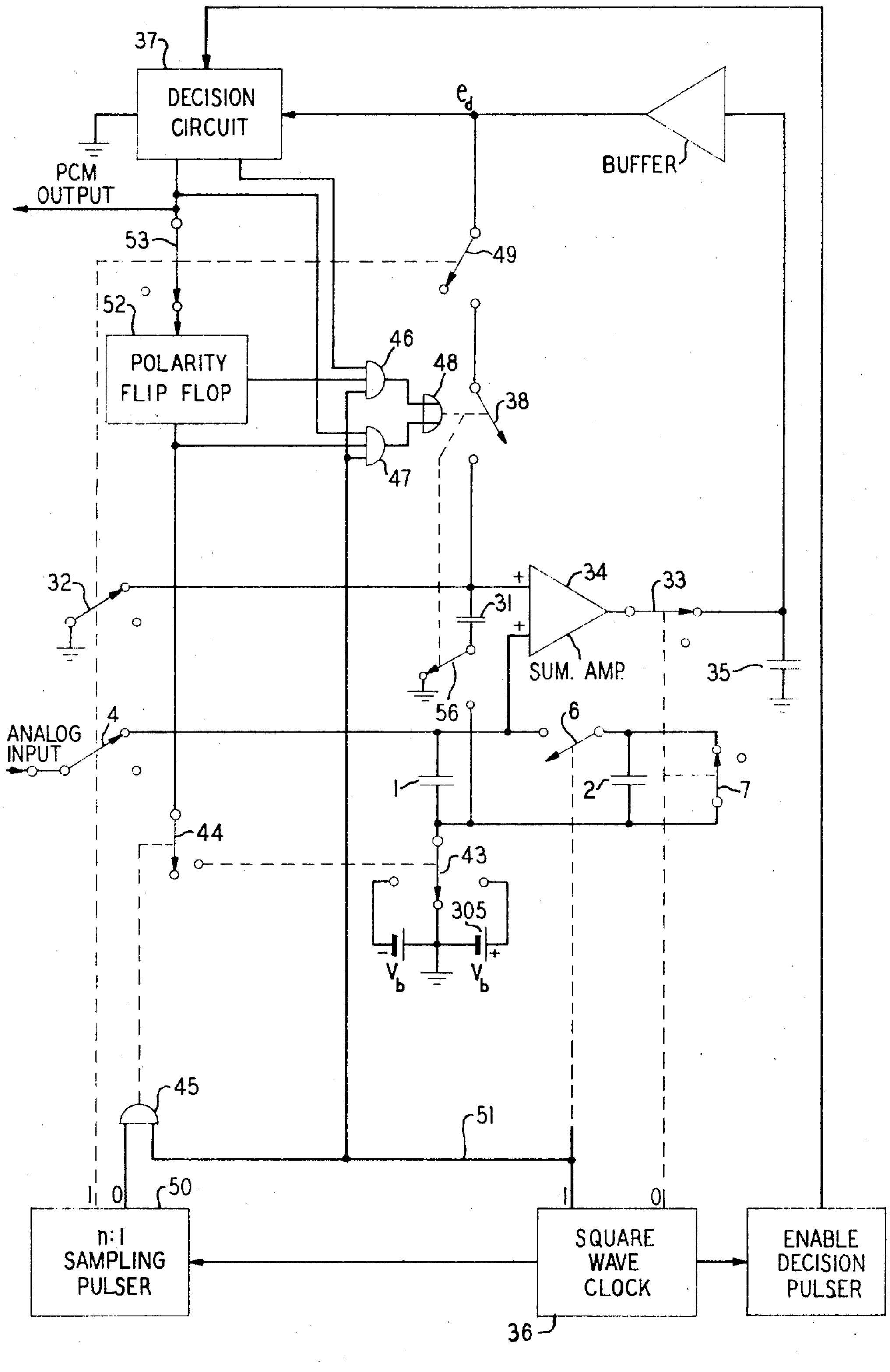
FIG. 5 depicts diagrammatically a second illustrative embodiment of the invention.

FIG. 5 shows a diagram of a second illustrative embodiment of the present invention. In this embodiment, capacitors 1 and 2, operating in conjunction with switches 4, 6 and 7, still perform the redistribution function for a quantum level generator. In this embodiment, however, the voltage which is actually used for the quantum levels is the voltage on capacitor 1, rather than that on capacitor 2. This change cuts the necessary quantum level range by one half, thus facilitating greater encoding accuracy. The particular redistribution process, however, is identical to the one employed in FIGS. 1 and 2. Once more, self-companding is attained by utilizing the analog input voltage as redistribution reference voltage for capacitor 1.

Another change shown in FIG. 5 which was not contained in the embodiment of FIG. 2 is the addition of a polarity switching mechanism. This mechanism comprises a gating means 45 which operates the single pole, triple throw switch 43 via switch 44 to control the polarity of reference via source 305. The three poles of switch 43 allow the bottom of capacitors 1, 2 and 31 to be biased at ground, negative $V_b$, or positive $V_b$. For the first digit of the PCM word, switches 43 and 56 are grounded. The first loop cycle then acts as a polarity determining one, and by means of logic gate 45, switch 44, and switch 43, reference source 305 is switched to the proper polarity. In this manner analog samples of both polarities can be encoded. This operation is described in greater detail hereinafter. The foremost change shown in the embodiment of FIG. 5 is the replacement of the buffered bootstrapping arrangement with a dual input summing amplifier 34. Accordingly, to preserve the operational analogy to FIG. 2, capacitor 31 is connected by means of a switch 56 either to ground or to the reference bias source 305. Switch 56 operates under the control of gate 48 in the same manner as does switch 38. Thus, at those times in which $e_d$ is being impressed onto capacitor 31, switch 56 is closed such that capacitor 31 is connected to the offset bias voltage 305. On the other hand, whenever a summation is to take place, both switches 38 and 56 are opened (i.e., switch 56 is connected to ground) and the operational analogy between FIGS. 2 and 5 is preserved.

The summing amplifier arrangement operates as follows. During the interval in which the polarity digit is being determined, sampling pulser 50 generates a pulse which is as long as one full period of the square wave clock 36. The output of the pulser closes switches 4, 32, and 53 and opens switch 49. Pulser 50 also provides one enabling input pulse to gate 45 so that during the first half of the square wave clock cycle, gate 45 is enabled and switch 44 is thereby opened. As a result switch 43 is connected to ground as shown. Capacitor 1 is then charged to the sample voltage and capacitor 31 is discharged since both switches 32 and 56 are connected to ground. Capacitor 35 is thus charged to the analog sample level by means of amplifier 34 and switch 33; thus the analog sample voltage therefore appears at the input of decision circuit 37 as $e_d$. The operation of the decision circuit 37 during this first full cycle is therefore dependent solely on the polarity of the input sample. During this interval the charge on capacitor 31 cannot be affected by the polarity decision since switch 49 is open. The output of decision circuit 37 sets a polarity flip flop 52 to the corresponding polarity by means of momentarily closed switch 53. Gate 45 is inhibited during the second half of the first square wave clock cycle, thereby closing switch 44. The signal from the polarity flip flop 52 sets switch 43 to the appropriate polarity reference voltage source where it remains for the duration of the coding operation.

To this point, switch 4 has not yet been opened, so capacitor 1 is then charged an additional amount corresponding to the bias offset voltage 305 which is $V_b$ in magnitude. When the analog input sample is positive, the negative terminal of bias source 305 is connected to the bottom of capacitor 1. Thus, the total voltage on capacitor 1 is increased by $V_b$ (i.e., $V_r + V_b$) where $V_r$ is the sample voltage. Similarly, when the input sample is negative, the positive terminal of bias source 305 is connected to capacitor 1 by way of switch 43 and again, the voltage stored across capacitor 1 is increased by $V_b$ (i.e., $-V_r - V_b$). Thus, the polarity is reversed for the two cases. Switches 4, 32 and 53 are opened at the termination of the pulse from sampling pulser 50 and switch 49 is closed so that capacitor 31 can be charged by way of switches 38 and 56 in accordance with the decisions, that is to $e_d \pm V_b$, depending upon the designated polarity source 305.

Square wave clock 36 alternately closes and opens switch 6, as before, while opening and closing switches 7 and 33. The voltage stored on capacitor 1 is thereby divided in half for each cycle of the square wave clock 36. The sum of the signal stored on capacitor 1 (e.g., $V_{c1} = V_r + V_b$ or $-V_r - V_b$) plus the voltage of bias source 305, and the voltage stored on capacitor 31 appears as the output of amplifier 34, which charges capacitor 35. In turn, this voltage appears as the next voltage $e_d$ to decision circuit 37.

For the configuration of FIG. 5, decision circuit 37 can be embodied as a simple zero level crossing detector which changes state as the sign of $e_d$ changes. The redistribution process reduces the voltage on capacitor 1, and subsequent summations by amplifier 34 continue until the decision state changes, at which time switches 38 and 56 are closed to charge capacitor 31 to $e_d$ offset by the bias voltage $V_b$.

Negative input gate 47 is enabled by polarity flip flop 52 whenever the input sample is negative. When $e_d$ becomes negative, the decision making circuit will change state and further enable negative input gate 47. The third enabling input to gate 47 is the second half of the square wave clock cycle. When all three inputs to gate 47 are present, a pulse is passed through this gate and OR gate 48 to close switches 38 and 56. This charges capacitor 31 to the value of $e_d$ plus the offset bias voltage $V_b$. Subsequent summations of the voltage on capacitor 31 and the redistributed voltage on capacitor 1 will produce results similar to that of the circuit of FIG. 2.

Positive signal samples, on the other hand, cause gate 46 to be enabled and gate 47 to be disabled. When decision circuit 37 changes state due to crossing the zero axis, this change of state permits a pulse to be gated through gates 46 and 48, thereby closing switches 38 and 56, thus charging capacitor 31 to the value of $e_d$ plus the offset bias voltage $V_b$. Subsequent operations proceed in the same manner as for negative input samples except that all polarities are reversed.

Both of the illustrative embodiments of the invention described herein were demonstrated for four digit encoding arrangements. This was an arbitrary choice; a different number of coding digits could be utilized by proper adjustment of the timing circuitry. In this way, encoding arrangements of virtually any degree of accuracy may be obtained.

The foregoing embodiments of the invention have been intended to illustrate the principles thereof. Numerous other embodiments of these principles may occur to workers skilled in the art without departure from the spirit and scope of the invention.

What is claimed is:

1. An encoder for converting an analog sample to a digital word comprising:

a source of timing pulses;

first, second, third and fourth capacitors;

means for biasing said first and second capacitors to a first reference voltage;

means for coupling an analog sample to said first capacitor;

means under the control of the timing pulses for developing a staircase voltage waveform by periodically coupling together said first and second capacitors, allowing charge to be redistributed therebetween, said second capacitor being discharged prior to each coupling;

means for periodically applying to said third capacitor the sum of the voltage on said fourth capacitor and said staircase voltage waveform;

means for comparing the voltage on said third capacitor with a second reference voltage, each comparison representing a digit of the digital word;

and means, responsive to said means for comparing, for charging said fourth capacitor to the voltage on said third capacitor plus said first reference voltage.

2. An encoder as described in claim 1 wherein said means for applying the voltage sum to said third capacitor includes a buffering means, said fourth capacitor being connected to said second capacitor and said buffering means being connected between said fourth and said third capacitors.

3. An encoder as described in claim 1 wherein said means for applying the voltage sum to said third capacitor comprises a unity gain voltage summing amplifier, the voltages on said first and fourth capacitors being added by said amplifier and their sum being placed on said third capacitor.

4. An encoder as described in claim 1 wherein said means for comparing the voltage on said third capacitor with a second reference voltage includes means for producing digital signal pulses whenever the voltage on said third capacitor is zero volts or less during at least a portion of the timing signal, said means for charging said fourth capacitor being energized upon the production of each of said signal pulses.

5. An encoder as described in claim 1 wherein said first and second capacitors are capacitors having equal capacitances.

6. An encoder as described in claim 1 wherein said means for biasing said first and second capacitors includes DC voltage sources of equal magnitude and opposite polarity, said encoder further including means for sensing the polarity of an analog sample and means, responsive to said means for sensing the polarity of said sample, for coupling only one of said DC voltage sources to said first and second capacitances.

7. An encoder for converting an analog sample to a digital word comprising first and second capacitors; a reference voltage source; means for charging said first capacitor with the analog sample plus a first reference voltage from said reference voltage source; means for alternatively coupling said second capacitor in parallel with said first capacitor and discharging said second capacitor so as to produce a staircase voltage waveform; and means for periodically comparing said staircase voltage waveform with a second reference voltage level; said means for periodically comparing including third and fourth capacitors, means for charging said third capacitor with the voltage stored on said fourth capacitor plus said staircase voltage waveform, and means for charging said fourth capacitor with the voltage on said third capacitor plus said first reference voltage in response to a predetermined magnitude relationship between the voltage on said fourth capacitor and said second reference voltage level ; whereby a digital bit in the digital word is produced when the staircase voltage waveform presents a voltage level having a predetermined magnitude relationship to the second reference voltage level.

8. An encoder as defined in claim 7 wherein said means for charging said third capacitor includes a buffer amplifier having an input and an output, means for coupling the output of said buffer amplifier to said third capacitor, and means for coupling the input of said amplifier to a series connection of said fourth capacitor, said second capacitor and said reference voltage source.

9. An encoder as defined in claim 7 wherein said means for charging said third capacitor includes a voltage summing amplifier having two inputs and an output, means for coupling the output of said amplifier to said third capacitor, means for coupling one of said two inputs to said fourth capacitor, and means for coupling the staircase voltage waveform to the other of said two inputs.

* * * * *